United States Patent [19]

Corratti et al.

[11] Patent Number: 5,482,380
[45] Date of Patent: Jan. 9, 1996

[54] DOUBLE TILTING PAD JOURNAL BEARING

[76] Inventors: Anthony A. Corratti, 30 Rennie Rd., Catskill, N.Y. 12414; Edward A. Dewhurst, 774 Westmoreland Dr., Niskayuna, N.Y. 12309

[21] Appl. No.: 295,137

[22] Filed: Aug. 24, 1994

[51] Int. Cl.$^6$ ....................................... F16C 17/03
[52] U.S. Cl. ............................. 384/311; 384/309
[58] Field of Search ...................... 384/309, 310, 384/311, 312, 117

[56] References Cited

U.S. PATENT DOCUMENTS

| | | | |
|---|---|---|---|
| 3,297,371 | 1/1967 | Salzman | 384/312 |
| 3,823,991 | 7/1974 | Lamperski | 384/309 |
| 4,039,228 | 8/1977 | Repose et al. | 384/312 |
| 4,597,676 | 7/1986 | Vohr et al. | 384/311 X |
| 4,714,357 | 12/1987 | Groth et al. | 384/312 |

OTHER PUBLICATIONS

"Pivoted Shoe Journal Bearing Engineering Catalog"—Orion Corporation; 1988.
"Tilting Pad Journal Bearing Selection Guide"—Waukesha Bearings, no date.
"Tilting Pad Journal Bearings"—The Glacier Metal Company Limited; 1980.
"Kingsbury Pivoted Shoe Journal Bearings"—Kingsbury, Inc., no date.

Primary Examiner—Thomas R. Hannon

[57] ABSTRACT

A double tilting pad journal bearing includes a substantially cylindrical, open ended beating casing having a longitudinal axis extending therethrough, an interior surface of which supports a plurality of beating liner pads for circumferential and axial tilting movement relative to the casing and to the longitudinal axis. The casing is formed with a pair of annular oil feed grooves in the exterior surface thereof communicating with the interior of the bearing casing by a plurality of radially directed feed passages. The interior surface is also formed with at least one oil drain annulus in communication with at least one radially oriented drain port. Annular seals are fitted within grooves at opposite ends of the bearing casing. The bearing liner pads are secured within the casing by a sliding tongue and groove fit which nevertheless permits tilting of the pads both circumferentially and axially. Locking pins are used to hold the bearing liner pads in proper circumferential orientation within the bearing casing.

17 Claims, 5 Drawing Sheets

DOUBLE TILTING PAD JOURNAL BEARING

TECHNICAL FIELD

This invention relates to beatings for rotatable machine shafts and, specifically, to a double tilting pad journal bearing for a steam turbine rotor.

BACKGROUND

Tilting pad journal beatings are typically employed in turbine system constructions, with two bearings per rotor span a common arrangement. Bearings incorporating double tilting pads are also known.

Double tilting pad journal bearings are typically complex and difficult to manufacture in a cost effective manner. Generally, known bearing designs include milling and fitting operations during manufacture that give rise to complex manufacturing processes. For many of the existing bearing designs, special tools and equipment are required to incorporate the desired features. For example, the current double tilting pad bearing designs use hardened steel plates with spherical radii to accomplish the tilting of the pads. Generation of those radii, however, requires special equipment. Other designs use oil feed annuli on the sides of the beating casing which require special covers to seal in the oil. Some designs use end plates bolted onto the ends of the bearing casing with pins inserted through the plates into the bearing pads to prevent rotation of the pads. The use of these plates complicates the design by the addition of parts and related manipulative steps in the assembly process.

In many cases, special fixtures are required to accomplish the final boring of the bearing inner diameter. For example, though many beatings have an individual pad oil feed feature, the machining operations required to provide this feature are complex (radial and axial drilling operations) and do not, in any event, insure an even distribution of oil to the leading edge of the pads.

Some existing designs employ floating seal rings at the end of the bearing casing for oil flow control. This method leads, however, to higher power losses and higher operating temperatures for the bearing. Others use the relatively massive end plates for oil control and this can lead to hard scoring of the rotor.

DISCLOSURE OF THE INVENTION

The object of the double tilting pad journal bearing in accordance with this invention is to reduce time consuming machining operations and to reduce special manufacturing equipment requirements. This new design accomplishes these objectives by maximizing the use of turning operations to produce the desired features. In other words, the most economical machining operations are those in which the component is turned to produce the desired feature (such as by lathe or vertical boring mill work), and the new design in accordance with this invention maximizes the use of turning operations which leads to manufacturing costs that are on the order of 40% less than those of other designs.

The bearing design of this invention constitutes an improvement over existing double tilting pad bearing designs. The improvements are discussed generally immediately below, and in greater detail later in conjunction with the detailed description of the drawings.

The double tilting pad bearing casing of this invention is comprised of split cylindrical half sections, each of which supports (in the exemplary embodiment), three double tilting liner pads and associated adjustable wear pads. In this arrangement, the static load of the bearing is carried primarily by a single, centrally located liner pad in the lower half section of the casing. The number of liner pads and their orientation, however, is not limited to the configuration shown herein. In addition, both the quantity of liner pads and the orientation of the pads may be varied as desired.

The bearing liner pads are made preferably from a single ring of material. Usually, a sacrificial material is bonded in some manner to the inner bore of the bearing pad material to protect against scoring of the rotor or shaft. The grooves in the pad end surfaces are machined into the pad ring. If needed, wear pads are installed in the bearing liner pad ring. Holes to accommodate locking pins are drilled at the outer diameter of the ring at the bearing centerline in the radial direction. The bearing liner pad ring is then cut into the appropriate number of liner pads. The pads are then installed in the bearing casing for final machining of the beating bore. The lock pin holes in each pad are threaded to accept bolts in place of the usual lock pins, to firmly secure the liner pads in the casing. After this is done, the bore of the beating pads may be finish machined.

The new design does not require hardening or tempering of the bearing liner pads and associated wear pads. Rather, the radii that produce the tilting of the pads are created simply by using vertical boring mill or lathe turning operations.

Oil feed annuli, axially spaced along the bearing casing, are machined on the outer diameter and around the entire circumference of the casing. A pocket or groove is milled on the outer diameter of the bearing to connect the source of oil with the two feed annuli. The use of more than one oil supply annulus allows for the even distribution of oil at the entrance to each liner pad. The placement of the annuli on the outside diameter of the bearing casing reduces the required oil feed port creation to a single radial drilling operation and eliminates the need for special cover plates, as the existing bearing supporting component acts as the sealing medium for the oil. Oil is admitted to the leading edge of each bearing liner pad via passages drilled in the radial direction from the feed annuli to the inner diameter of the bearing casing.

The bearing in accordance with this invention does not have separate end plates but, rather, uses machined tongue and groove fits in the casing and bearing liner pads for retention of the pads, along with anti-rotation pins mounted on the axial center line of the bearing. More specifically, the inner bore of the casing is machined to provide annular, inwardly facing tongue portions receivable within complementary end grooves in the liner pads to retain the bearing liner pads within the casing. This retention feature, coupled with the utilization of locking pins at the bearing axial centerline and installed in the radial direction, retain the bearing pads during installation, operation and maintenance of the bearing. This arrangement eliminates pans and allows fur machining of the bearing bore with the bearing liner pads in the casing. Locking bolts are used in place of the anti-rotation pins to secure the pads in the casing for the bearing bore machining operation.

The material for the bearing casing is chosen such that the end plates/seals of the bearing may be machined integral with the casing. This is done to eliminate parts, along with certain assembly procedures previously required, and to provide a stronger casing than in prior designs. To this end, grooves are machined into the casing and the inner diameter at each end of the casing. Seal teeth are inserted into these grooves for oil flow control. The use of such seals keeps power losses to a minimum, lowers bearing operating temperatures and minimizes the severity of shaft scoring.

The features of the bearing in accordance with this invention are achieved by machining cylindrical components. In the described embodiment, the bearing casing is split into upper and lower halves and the joints of the two halves of the casing are milled flat and mated to each other. The halves (also referred to as bearing casing half sections) are held together with bolts and located with dowels at each joint. Thus, references herein to "annular" surfaces, grooves, seals, etc. are made relative to the bearing as a whole, with the half sections assembled to form an open ended cylindrical bearing casing.

Another feature of this invention relates to the presence of annuli machined on the inner diameter of the casing (located behind and at the ends of the bearing liner pads) to accomplish cooling of the bearing liner pads and to allow the exit of some of the oil through ports machined in the casing. An adjustable wear pad, associated with each bearing liner pad, is installed either in the casing or in the associated bearing pad and secured with fasteners. These wear pads are finish machined while assembled in place.

Thus, in one aspect, the invention here relates to a tilt pad journal bearing for a rotor comprising a substantially cylindrical, open ended bearing casing having a longitudinal axis extending therethrough, an interior surface of which supports a plurality of double tilting bearing liner pads for circumferential and axial tilting movement relative to the casing and the axis; the casing formed with at least one annular oil feed groove in an exterior surface thereof communicating with the interior of the bearing casing by a plurality of radially directed feed passages; the interior surface also formed with at least one oil drain annulus in communication with at least one radially oriented drain port.

In another aspect, the invention relates to a tilt pad journal bearing for a rotor comprising a substantially cylindrical, open ended bearing casing having a longitudinal axis extending therethrough, an interior surface of which supports a plurality of bearing liner pads for circumferential and axial tilting movement relative to the casing and the axis; the casing formed with at least one annular oil feed groove in an exterior surface thereof communicating with the interior of the bearing casing by a plurality of radially directed feed passages, the interior surface also formed with at least one oil drain annulus in communication with at least one radially oriented drain port; a wear pad provided at the interface of each bearing pad and the interior surface of the casing, each wear pad associated with a liner bearing pad in an upper half of the casing secured directly to the associated bearing pad, and each wear pad associated with a bearing pad in a lower half of the bearing casing secured directly to the bearing casing; and wherein the bearing pads are provided with grooves on opposite end surfaces thereof, and the bearing casing is provided with inwardly projecting, annular tongues at opposite ends thereof, the tongues slidably received within the grooves.

In general, the improved double tilting journal bearing in accordance with this invention improves over all current designs insofar as it maximizes the use of machine turning operations to develop the desired features, leading to lower manufacturing costs. The basic features of this new design may be summarized generally as follows:

a) circumferential oil feed paths on the outer diameter of the bearing casing;

b) individual pad oil feed;

c) integral pad pivot radii;

d) adjustment/wear pads for alignment which do not require hardening;

e) integral end plates on the bearing casing;

f) machining of bearing bore without special equipment;

g) fixed seal teeth for oil flow control at the ends of the bearing casing; and h) maximum use of machine turning operations.

Additional objects and advantages of the present invention will become apparent from the detailed description which follows.

BEST MODE FOR CARRYING OUT THE INVENTION

Figure 1:
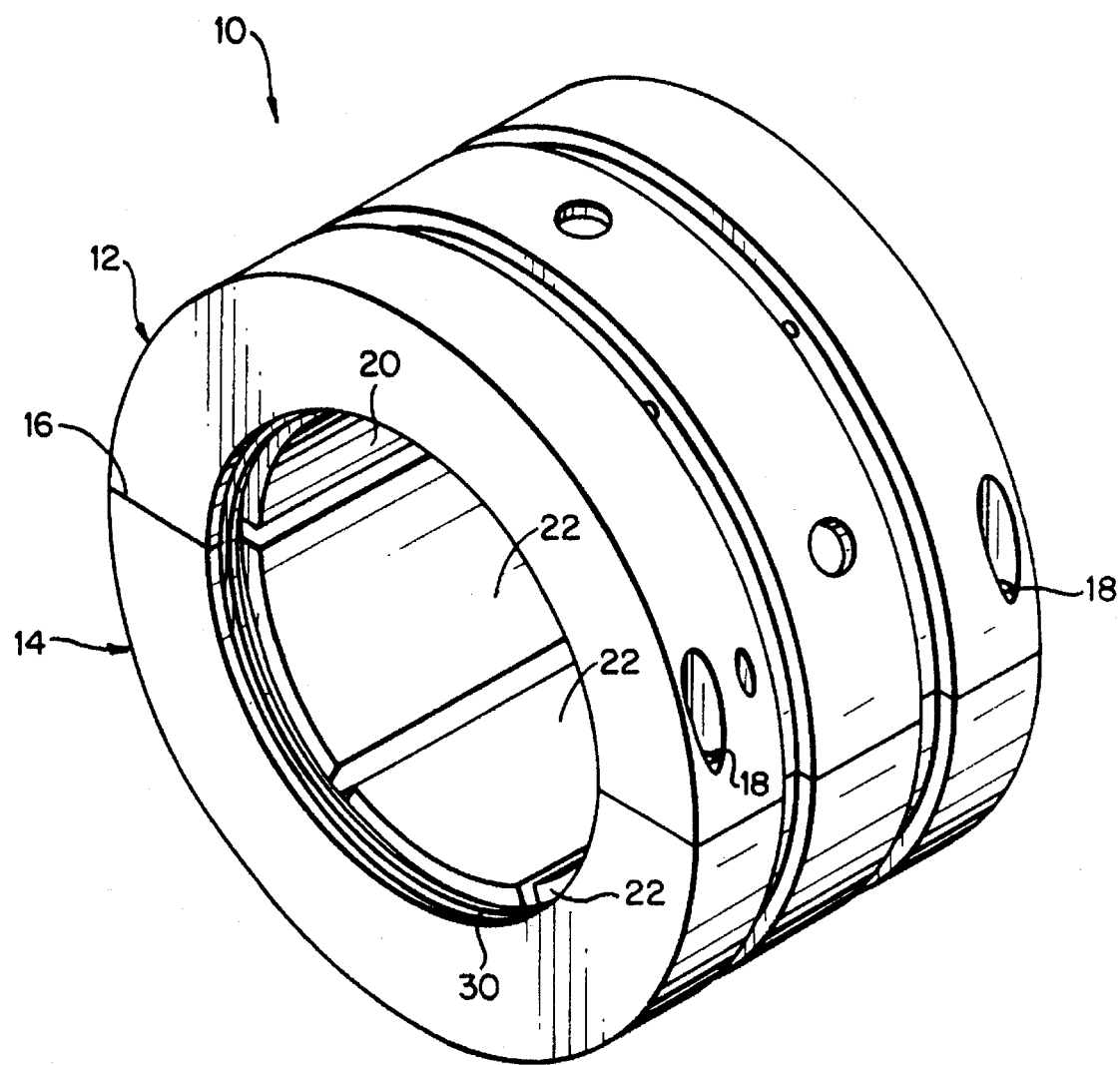
FIG. 1 is a perspective view of a double tilting pad journal bearing in accordance with the invention.
Figure 5:
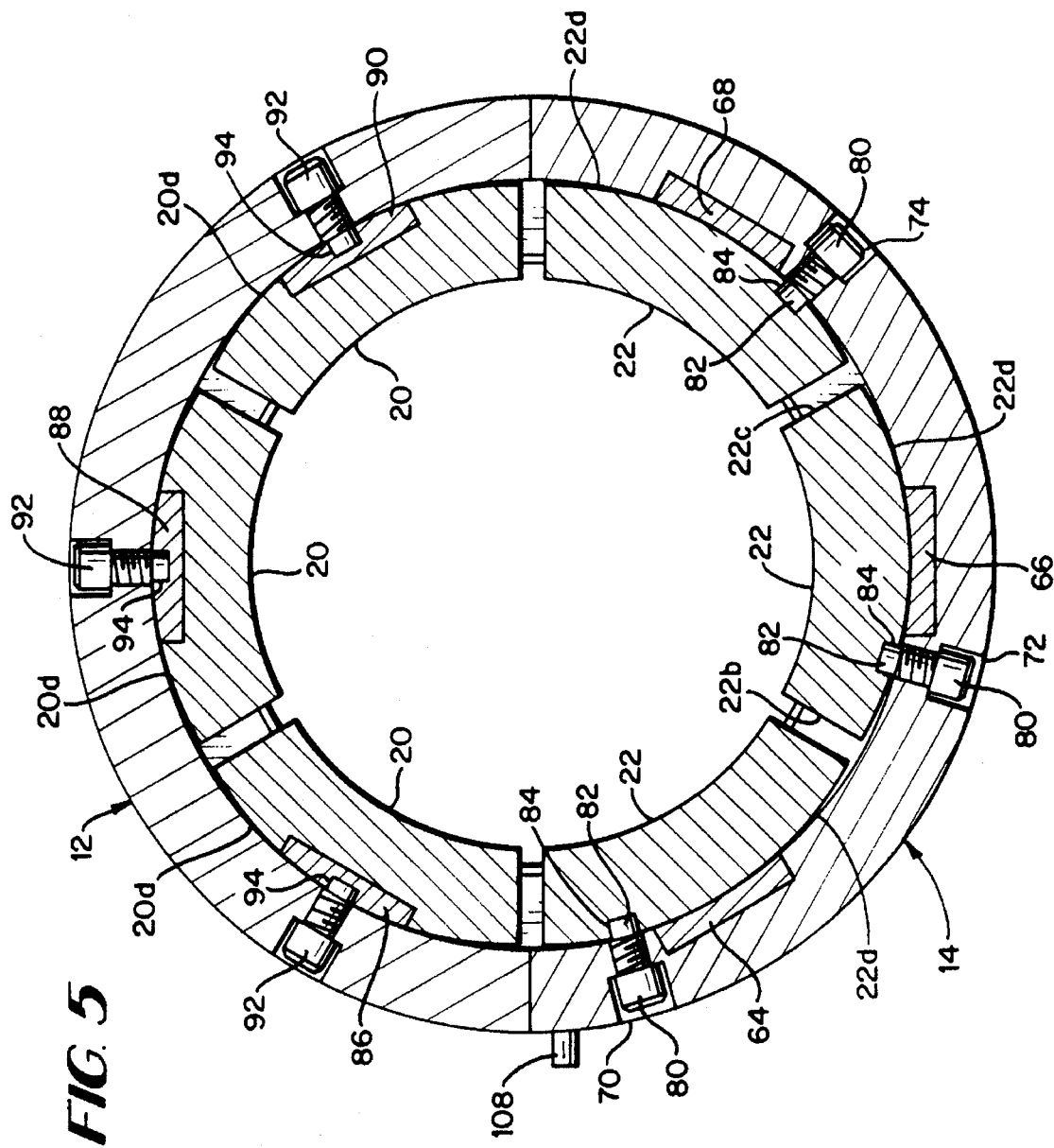
FIG. 5 is a section taken along the line 5—5 of FIG. 4.

FIG. 1 illustrates a double tilting pad journal bearing assembly which includes a housing or casing 10 having an upper half section 12 and a lower half section 14, joined at an interface 16 and secured by bolts 18 at diametrically opposed sides of the housing. The housing is essentially an open ended tubular member, with interior and exterior surfaces describing (when the half sections are assembled) circles of various diameters as explained in greater detail below. With reference also to FIG. 5, casing 10 mounts a plurality of double tilting bearing liner pads, a first set of three tilting liner pads 20 secured in the upper half section 12, and a second set of three tilting liner pads 22 secured in the lower half section 14. Before describing the tilting pad arrangement in detail, however, it will be helpful to explain the casing construction, best seen in FIGS. 1–3.

The upper half section 12 and lower half section 14 are similar, with differences noted. Generally, surfaces formed in one half of the bearing casing are carried over and repeated in the other half, so that continuous, annular surfaces are created. With specific reference to FIG. 3, the interior of the lower half section 14 has a pair of reduced diameter end surfaces 24 and 26 at opposite ends of the housing, each formed with an inwardly facing groove 27, 29 for mounting and securing a metal seal tooth 28, 30, respectively, for engagement with a rotor about which the housing is secured. The use of seals 28, 30 keeps power losses to a minimum, lowers bearing operating temperatures and minimizes severity of shaft scoring. Inwardly of the end surfaces 24 and 26 are larger diameter annuli or grooves 32, 34 which serve to circulate the oil to cool the bearing pads 20, 22. Drain holes 36, 38 are provided within the annuli or grooves 32, 34 in the lower half section 14, but not in the upper half section 12. These drain holes 36, 38 are located so as to be circumferentially behind the lower liner pads. Inwardly of the grooves 32, 34, there are provided three journal pad surfaces 40, 42 and 44, with surfaces 40 and 44 having smaller diameters than oil grooves 32, 34 (but larger than end surfaces 24, 26) and just slightly larger than center surface 42.

Figure 3:
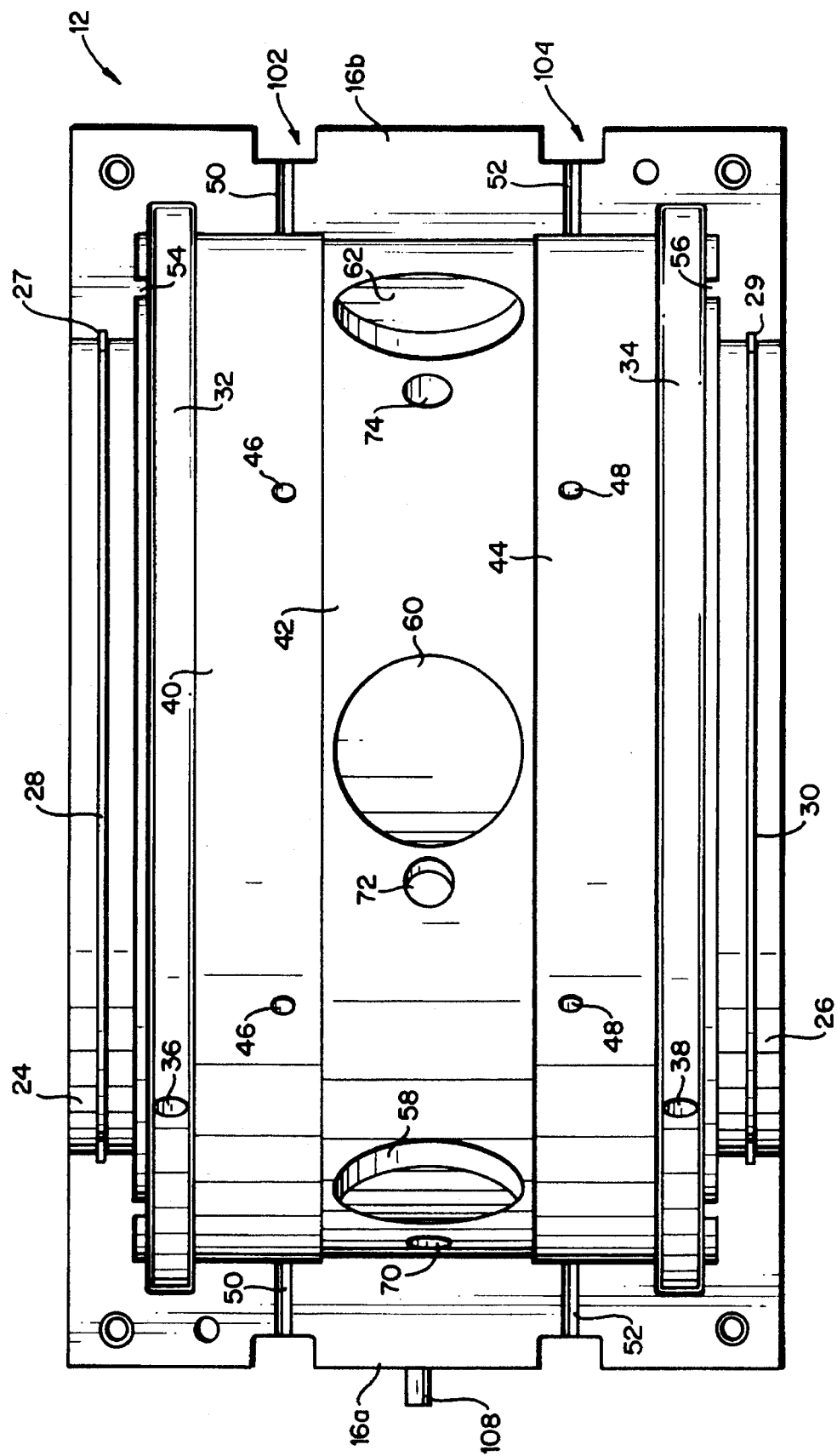
FIG. 3 is a plan view of the lower bearing half section, with bearing pads removed.
Figure 4:
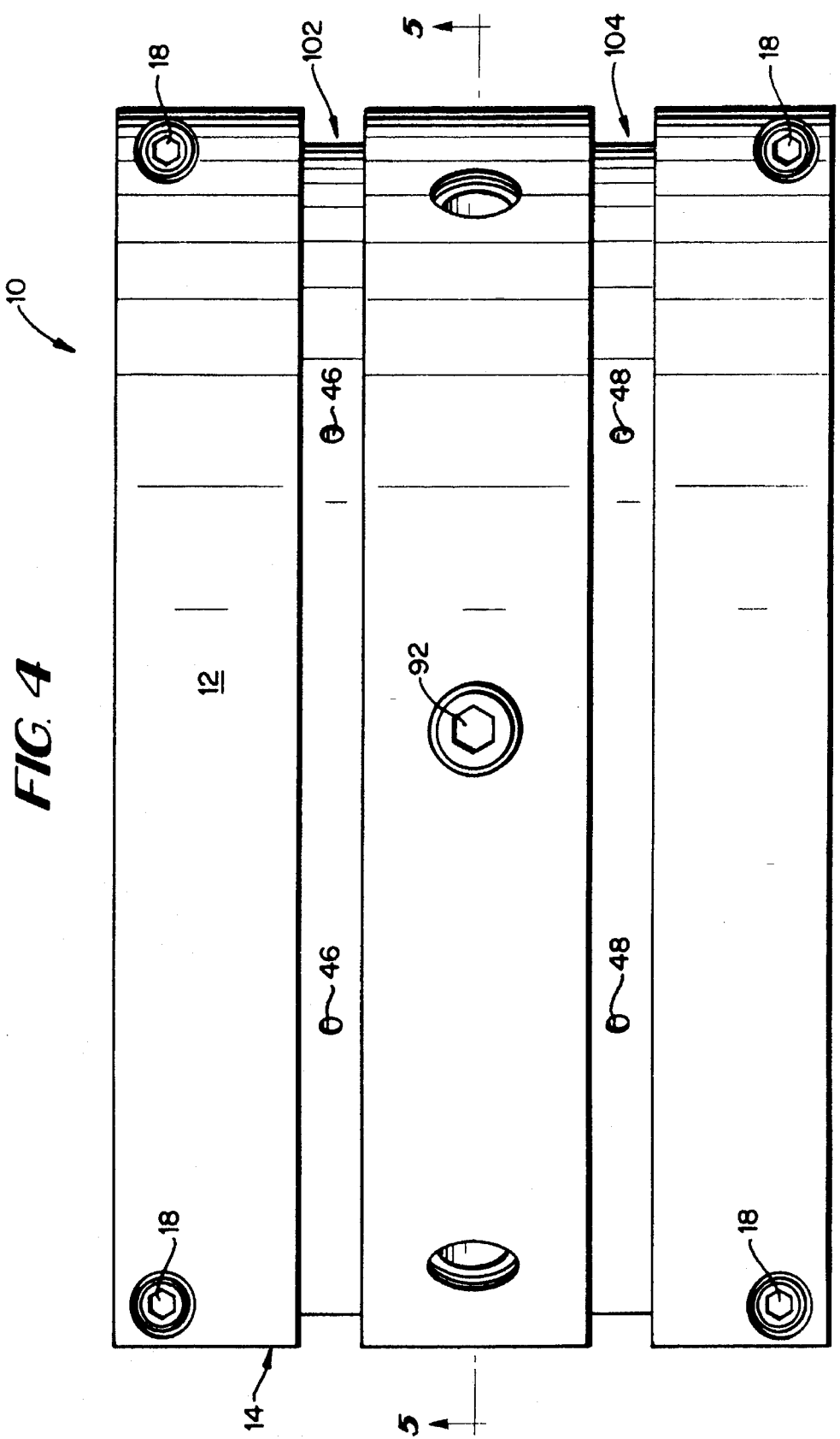
FIG. 4 is a top plan view of the bearing illustrated in FIG. 1.

Both upper and lower half sections 12 and 14 are provided with two pair of radial oil feed passages or ports 46, 48, in surfaces 40, 44, respectively. In addition, interface surfaces 16a, 16b of the lower half section only are also formed with two pairs of axial oil feed ports 50, 52 also leading to the surfaces 40, 44 as best seen in FIG. 3, and as explained in greater detail below.

Both half sections 12 and 14 are also formed with axially projecting rims or tongues 54, 56 which are utilized for liner pad retention, as also described further below.

The lower half section 14 also includes three circular recesses 58, 60 and 62 for reception of adjustable wear pads 64, 66 and 68 (see FIG. 5) which are secured to the casing by screws or other suitable means. Adjacent lock pin through holes (counterbored and threaded) 70, 72 and 74 are located adjacent the recesses 58, 60 and 62, respectively, and serve (with associated pins described below) to prevent the individual pads 22 from moving circumferentially about the lower half section 14 of the housing 10.

Figure 2:
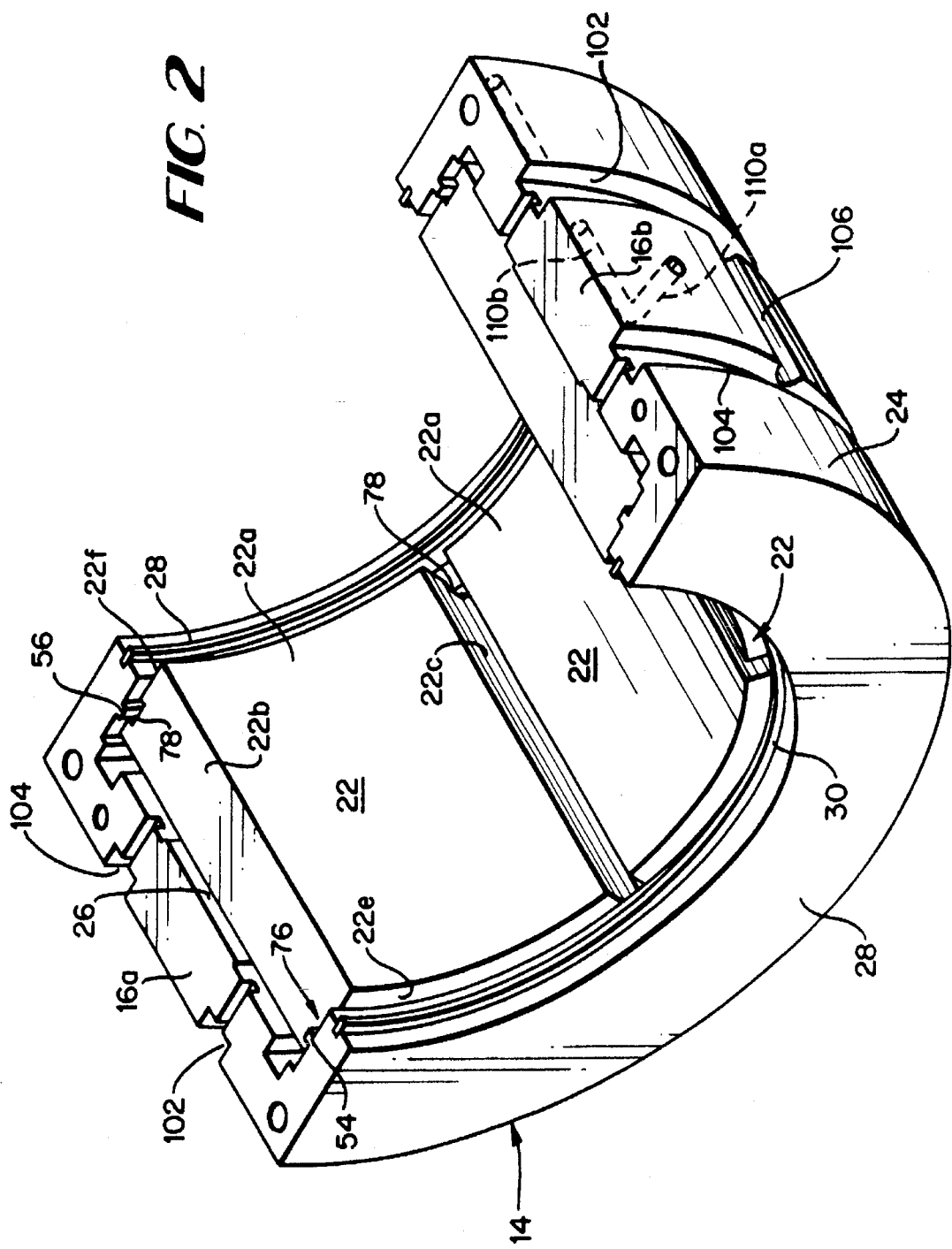
FIG. 2 is a perspective view of the lower half of the bearing illustrated in FIG. 1.

With reference especially to FIGS. 2 and 5, it may be seen that each of the tilting pads 22 has an arcuate surface or front face 22a on the radially interior portion thereof, which surface are adapted to engage a rotor (not shown) passing through the bearing. Side surfaces 22b and 22c of each bearing extend radially outwardly to the rear face 22d. Back surface 22d has a slightly spherical shape which allows the pad to tilt or rock both circumferentially and axially relative to the interior annular or circular surfaces 40, 42 and 44. Pad end surfaces 22e and 22f are formed with axially facing grooves 76 and 78 which are adapted to receive the rings or tongues 54, 56, respectively. In other words, each pad 22 may be mounted in the lower half section 14 by aligning grooves 76, 78 with tongues 54, 56 at one interface (e.g., right side surface 16b in FIG. 2), and then sliding the pad around the interior of the housing half section, with rings or tongues 54, 56 acting as slides or tracks. It should be noted here that the grooves 76, 78 are sufficiently larger than tongues 54, 56 to permit the tilting movement previously described.

As each tilting pad 22 is properly oriented, a locking pin 80 (FIG. 5) is threaded into the appropriate one of the holes 70, 72, and 74, with a free, unthreaded end 82 of the pin 80 extending into a corresponding recess 84 formed in the back surface 22d. As previously explained, these pins 80 prevent circumferential "walking" or "creeping" of the pads 22 about the interior of the housing.

For the upper tilting pads 20, the slightly spherical back surfaces 20d are provided with recesses for receiving the wear pads 86, 88 and 90, outer surfaces of which are machined to match the curvature of surfaces 20d. These wear pads are secured to the liner pads 20 by screws or other suitable means. For the upper tilting pads 20, it is acceptable to have the wear pads 86, 88 and 90 received within the liner surfaces 20d but this is not acceptable for the lower liner pads 22 in light of the significantly greater loads experienced by the lower liner pads. Accordingly, the lower wear pads 64, 66 and 68 are received within the casing itself, as described above. Assembly of the upper liner pads 20 to the upper casing section 12 is similar to that described above for pads 22, with grooves in the pad end surfaces aligned circumferentially and axially with tongues 54, 56 on the casing. A locking pin 92 is similarly employed to hold each of the pads 20 in the proper circumferential orientation, it being noted that, unlike the eccentric location of pins 80 relative to the pads 22, pins 92 are centered on each pad 20 and project into recesses 94 in the wear pads 86, 88 and 90.

The assembly of bearing housing sections 12 and 14 to one another is facilitated by dowel pins (not shown), utilizing dowel receiving holes 98, 100 at opposite corners of the respective interface surfaces 16a and 16b in each housing section.

The exterior of the housing 10 (both sections 12 and 14) is machined to include axially spaced oil feed annuli or grooves 102 and 104 aligned with oil feed ports 46, 48 and 50, 52, respectively. These annuli are connected by an axial passage or groove 106 (see FIG. 2). An anti-rotation pin 108 projects radially from section 14 and prevents rotation of the bearing once assembled in the bearing stand (not shown).

In use, oil supplied to the bearing from a source (not shown) aligned with passage 106 travels evenly through annuli 102, 104 and then through ports 46, 48, 50 and 52 between the individual tilting pads 20 and 22 to thereby uniformly lubricate the rotor engaging surfaces 20a, 22a, respectively. The oil then drains through the drain holes 36, 38 behind the lower liner pads 22 to an oil recirculation system (not shown). The oil flow scheme is such that equal amounts of oil are supplied to each pad, and there is an even distribution of oil in both circumferential and axial directions.

It is another feature of the invention to provide a flush line through the bearing housing which permits source oil to bypass the bearing pads. This passage includes radial component 110a and axial component 110b, the former extending far enough into the housing wall (but not through to the interior of the bearing) so that axial component 110b does not intersect the annuli 102, 104. In this way, when it is desired to flush the source line, the bearing (after removal of the anti-rotation pin 108) may be rotated so that passage component 110a is aligned with the oil supply source line. Following the flushing procedure, the bearing may be returned to its normal position, with the source line aligned with axial passage 106.

With the above physical arrangement, certain manufacturing benefits are realized, as summarized above. In addition, cost advantages over prior designs allows several uses for this bearing design in both original equipment manufacture and retrofit activities.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, though the casing 10 is referred to herein as having an upper half section 12 and a lower half section 14, it is contemplated that the split line between sections could be at an orientation other than horizontal and still be within the scope of the claims.

What is claimed is:

1. A double tilting pad journal bearing comprising:

a substantially cylindrical, open ended bearing casing having a longitudinal axis extending therethrough, an interior surface of which supports a plurality of double tilting bearing liner pads for circumferential and axial tilting movement relative to said casing and said axis; said casing formed with at least one annular oil feed groove in an exterior surface thereof communicating with the interior of the bearing casing by a plurality of radially directed feed passages; said interior surface also formed with at least one oil drain annulus in communication with at least one radially oriented drain port.

2. The double tilting pad journal bearing of claim 1 wherein said external surface is formed with a pair of annular, axially spaced oil feed grooves, each in communication with said interior of said bearing casing by a plurality of said radially directed feed passages.

3. The double tilting pad journal bearing of claim 2 wherein said pair of annular, axially spaced oil feed grooves are connected by at least one axial groove formed in said exterior surface.

4. The double tilting pad journal beating of claim 1 wherein said plurality of double tilting bearing liner pads are separated from each other by circumferentially spaced, axially extending spaces, and wherein said plurality of radially directed feed passages are aligned with said spaces.

5. The double tilting pad journal bearing of claim 1 wherein said bearing casing is formed in two half sections secured to each other.

6. The double tilting pad journal beating of claim 1 wherein annular seals are fitted in inwardly facing grooves at opposite ends of said casing.

7. The double tilting pad journal beating of claim 1 wherein a wear pad is provided at the interface of each double tilting bearing liner pad and said interior surface of said casing, and wherein each wear pad associated with a beating liner pad in an upper half of said casing is secured directly to the associated bearing liner pad and further wherein each wear pad associated with a bearing liner pad in a lower half of said bearing casing is secured directly to said bearing casing.

8. The double tilting pad journal bearing of claim 1 wherein said double tilting bearing liner pads are provided with axially facing grooves on opposite end surfaces thereof, and said bearing casing is provided with axially projecting, annular tongues at opposite ends thereof, said tongues slidably received within said grooves.

9. The double tilting pad journal bearing of claim 8 wherein each double tilting bearing liner pad is locked in a selected circumferential orientation by means of a locking pin.

10. The double tilting pad journal bearing of claim 1 and including an oil flush bypass passage in said casing.

11. A double tilting pad journal bearing comprising:

a substantially cylindrical, open ended bearing casing having a longitudinal axis extending therethrough, an interior surface of which supports a plurality of bearing liner pads for circumferential and axial tilting movement relative to said casing and said axis; said casing formed with at least one annular oil feed groove in an exterior surface thereof communicating with the interior of the beating casing by a plurality of radially directed feed passages, said interior surface also formed with at least one oil drain annulus in communication with at least one radially oriented drain port;

a wear pad provided at the interface of each bearing liner pad and said interior surface of said casing, each wear pad associated with a bearing liner pad in an upper half of said casing secured directly to the associated bearing pad, and each wear pad associated with a bearing liner pad in a lower half of said bearing casing secured directly to said bearing casing; and wherein said bearing pads are provided with axially facing grooves on opposite end surfaces thereof, and said bearing casing is provided with axially projecting, annular tongues at opposite ends thereof, said tongues slidably received within said grooves.

12. The double tilting pad journal bearing of claim 11 wherein said external surface is formed with a pair of annular, axially spaced oil feed grooves, each in communication with said interior of said bearing casing by a plurality of said radially directed feed passages.

13. The double tilting pad journal bearing of claim 12 wherein said pair of annular, axially spaced oil feed grooves are connected by at least one axial groove formed in said exterior surface.

14. The double tilting pad journal bearing of claim 11 wherein said plurality of bearing liner pads are separated from each other by circumferentially spaced, axially extending spaces, and wherein said plurality of radially directed feed passages are aligned with said spaces.

15. The double tilting pad journal bearing of claim 11 wherein said bearing casing is formed in two half sections secured to each other.

16. The double tilting pad journal bearing of claim 11 wherein annular seals are located in inwardly facing grooves at opposite ends of said casing.

17. The double tilting pad journal bearing of claim 11 and including an oil flush bypass passage in said casing.

\* \* \* \* \*